(12) United States Patent
Kurup

(10) Patent No.: US 10,035,910 B2
(45) Date of Patent: Jul. 31, 2018

(54) POLYMER COMPOSITION AND HEAT-SHRINKABLE ARTICLE

(71) Applicant: Tyco Electronics UK Ltd, Wiltshire (GB)

(72) Inventor: Sreeni Kurup, Swindon (GB)

(73) Assignee: Tyco Electronics UK Ltd, Wiltshire (GB)

( * ) Notice: Subject to any disclaimer, the term of this patent is extended or adjusted under 35 U.S.C. 154(b) by 0 days.

(21) Appl. No.: 15/361,805

(22) Filed: Nov. 28, 2016

(65) Prior Publication Data

US 2017/0073514 A1  Mar. 16, 2017

Related U.S. Application Data

(63) Continuation of application No. PCT/EP2015/058777, filed on Apr. 23, 2015.

(30) Foreign Application Priority Data

May 28, 2014 (GB) .................................. 1409413.0

(51) Int. Cl.

| | |
|---|---|
| *C08L 67/02* | (2006.01) |
| *H01B 3/30* | (2006.01) |
| *H01B 3/42* | (2006.01) |
| *H01B 3/44* | (2006.01) |
| *H01B 7/295* | (2006.01) |
| *C08K 5/5313* | (2006.01) |
| *C08L 23/08* | (2006.01) |

(52) U.S. Cl.
CPC .......... *C08L 67/025* (2013.01); *C08K 5/5313* (2013.01); *C08L 23/0869* (2013.01); *H01B 3/307* (2013.01); *H01B 3/421* (2013.01); *H01B 3/447* (2013.01); *H01B 7/295* (2013.01); *C08L 2201/02* (2013.01)

(58) Field of Classification Search
CPC ... C08L 67/025; C08L 2201/02; H01B 3/307; H01B 3/421; H01B 3/447; H01B 7/295
See application file for complete search history.

(56) References Cited

U.S. PATENT DOCUMENTS 6,068,935 A * 5/2000 Hayami ................ B29C 61/003
                                                            428/35.7
2011/0315423 A1  12/2011 Karayianni
2012/0225291 A1   9/2012 Karayianni

FOREIGN PATENT DOCUMENTS

| WO | 2008060549 A1 | 5/2008 |
| WO | 2009047353 A1 | 4/2009 |
| WO | 2009110230 A1 | 11/2009 |
| WO | 2011043260 A1 | 4/2011 |

OTHER PUBLICATIONS

Search Report, dated Sep. 25, 2014, 6 pages.
PCT Notification, International Search Report and Written Opinion, dated Jun. 12, 2015, 9 pages.
Abstract of WO2011043260, dated Apr. 14, 2011, 2 pages.
Abstract of WO2009110230, dated Sep. 11, 2009, 2 pages.

* cited by examiner

*Primary Examiner* — Michael C Miggins
(74) *Attorney, Agent, or Firm* — Barley Snyder

(57) ABSTRACT

A polymer composition is disclosed. The polymer composition comprises 30 to 40% by weight of a polyester-based thermoplastic elastomer, 15 to 25% by weight of an ethylene acrylic elastomer, and an organic phosphorus-based flame retardant comprising a metal salt of a dialkyl phosphinate.

18 Claims, No Drawings

POLYMER COMPOSITION AND HEAT-SHRINKABLE ARTICLE

CROSS-REFERENCE TO RELATED APPLICATIONS

This application is a continuation of PCT International Application No. PCT/EP2015/058777, filed on Apr. 23, 2015, which claims priority under 35 U.S.C. § 119 to United Kingdom Patent Application No. 20140009413.0, filed on May 28, 2014.

FIELD OF THE INVENTION

The present invention relates to a polymer composition, and more particularly, to a heat shrinkable article formed of the polymer composition.

BACKGROUND

Dimensionally recoverable articles such as heat-recoverable tubing are well known. Such articles are often used to provide electrical and environmental insulation over spliced wires or to protect areas of cables where there are breaks in the insulation. To provide adequate recoverability and flexibility, the articles generally comprise polymers. For many applications it is necessary that the polymer be flame-retardant in order to minimize the risk of damage in the event of a fire. Such flame-retardancy may be achieved either by the use of a halogen-containing polymer, for example a fluoropolymer, or by the addition of a halogenated material, for example a brominated or chlorinated compound such as decabromodiphenylethane, to a non-halogenated polymer, for example polyolefins such as polyethylene, ethylene copolymers or polyesters. An example of conventional halogenated tubing is DR25™ tubing, available from TE Connectivity.

Halogen-containing polymeric compounds with such flame retardancy are useful as they self-extinguish when removed from flame. However, they do have disadvantages, as they can undergo continuous combustion to produce a large quantity of smoke, or they can thermally decompose, releasing corrosive gases such as halogen acids which can be detrimental to personnel or sensitive electronic equipment.

Attempts have been made to incorporate halogen-free flame-retardants into polymer resins to overcome the above disadvantages. Halogen-free flame-retardants such as alumina trihydrate (ATH) must be used in relatively large concentration in order to give fully useful flame-retardancy to the resulting compositions. However, when a large concentration of halogen-free flame-retardant is added to a polymer resin, the resulting resin composition, when extruded, exhibits reduced physical properties, especially in tensile strength and elongation, and also greatly reduced aging and electrical properties. In addition, these compositions are difficult to extrude and expand into tubing, especially thin wall tubing.

When a composition is used in the form of tubing, a number of product-related flame tests are conducted. Of particular importance for Military and Aerospace applications are IEC 60684-3-271, VG 95343-5 Type D, SAE-AS-I-23053/16 which contains several different aspects, including measurements of the physical properties such as tensile strength and elongation, and a measurement of the performance of the tubing when exposed to a flame. According to VG 95343-5 Type D, combustion behavior test number 5.12.1.1, a section of heat shrink tube of size approximately 150 mm in length is shrunk on to a metal mandrel of approximately 200 mm in length having a diameter 10% greater than the inner diameter of the freely shrunk tubing. The test specimens are then marked and placed in the combustion chamber, marking the position of the specimen, point of application of the flame etc. according to the prescribed test method. For a flame applied for 60 seconds, to pass the flame test, the combustion must extinguish of its own within 15 seconds after the flame has been removed for type D products and 30 seconds for Type L products. It is also desirable that the tubing have adequate performance for continuous use at elevated temperature, for example at 150° C. for 3000 hours. Such high temperature performance is particularly important when the tubing is used for military applications.

While halogen-containing tubing has acceptable physical and flammability properties, for some markets, a zero-halogen containing material is required. As described above, however, known halogen-free polymers have poor physical properties.

SUMMARY

An object of the invention, among others, is to provide a halogen-free polymer composition having a high temperature rating, high chemical resistance, low weight, and superior tensile and elongation properties. The disclosed polymer composition comprises 30 to 40% by weight of a polyester-based thermoplastic elastomer, 15 to 25% by weight of an ethylene acrylic elastomer, and an organic phosphorus-based flame retardant comprising a metal salt of a dialkyl phosphinate.

DETAILED DESCRIPTION OF THE EMBODIMENT(S)

The invention is explained in greater detail below with reference to embodiments of a polymer composition. This invention may, however, be embodied in many different forms and should not be construed as limited to the embodiments set forth herein; rather, these embodiments are provided so that this disclosure will be thorough and complete and still fully convey the scope of the invention to those skilled in the art.

The polymer composition according to the present invention has an organic phosphorus based flame retardant in an elastomer matrix blend of a polyester-based thermoplastic elastomer and an ethylene acrylic elastomer. This polymer composition is suitable for producing heat shrinkable tubing and molded parts, non-heat shrinkable cable jackets, and wire and optical cable sheathing.

The polyester-based thermoplastic elastomer, in an embodiment, comprises a copolymer of polybutylene terephthalate and polyalkylene-ether glycol. An example of a commercially available suitable thermoplastic elastomer is HYTREL-4056. This particular material exhibits a unique combination of mechanical, physical and chemical properties and offers the advantage of outstanding resiliency, flexibility, high flexing fatigue resistance and resistance to mechanical damage.

The polymer matrix is a blend of the polyester-based thermoplastic elastomer and the ethylene acrylic elastomer. In order to provide the sufficiently high flexibility of the end products, blending the polyester-based thermoplastic elastomer with the pure elastomer leads to a material with outstanding performance. Ethylene acrylic elastomer further has excellent solvent resistance over a wide range of solvents and temperature, and at the same time offers good heat aging properties. The ethylene acrylic elastomer is a terpolymer of ethylene, methyl acrylate, and a cure site monomer. Such an ethylene acrylic elastomer is, for instance, available under the registered trade name VAMAC.

The ratio between the polyester-based thermoplastic elastomer and the ethylene acrylic elastomer achieves an improved solvent resistance, a high flexibility, reduced heat aging and low temperature properties. The amount of thermoplastic elastomer is between about 30% to 40% by weight of the total composition, whereas the ethylene acrylic elastomer is between about 15% to 25% by weight of the total composition. In an embodiment, the polyester-based thermoplastic elastomer is 36% by weight and the ethylene acrylic elastomer is 19% by weight. In another embodiment, the polyester-based thermoplastic elastomer is 35% by weight and the ethylene acrylic elastomer is 19% by weight.

The flame retardant is added to the elastomer matrix to reduce flammability of the end product. Metal salts of dialkyl phosphinates, in particular aluminium dialkyl phosphinates, are compatible with the polyester-based thermoplastic elastomer and ethylene acrylic elastomer. Such metal salt phosphinates are described for instance in the published international application WO 2011/043260A1. Key properties of aluminium dialkyl phosphinates, such as high phosphorus content, good thermostability, low density, and very low affinity towards moisture, have made this material a good choice for developing a lightweight, halogen-free, flame retardant and fluid resistant heat shrink formulation according to the present invention. The low temperature flexibility of the blend of polyester-based thermoplastic elastomer and ethylene acrylic elastomer is improved by adding about 18 to 22% by weight of aluminium dialkyl phosphinate.

A plasticizer can be further added to improve the low temperature flexibility of this blend. For instance, polyester adipate may be added in 5 to 6% by weight to significantly improve the low temperature properties in the range between −55° C. to −75° C. An example of a plasticizer that can be used with the formulations according to the present invention is PLASTHALL P-650.

As polyester elastomers are sensitive to moisture and require stabilizers to prevent hydrolytic degradation, an antihydrolysis agent can further be added to the formulation to protect the polyester elastomer from hydrolytic degradation. For instance, the antihydrolysis agent Stabaxol P which is an aromatic polymeric carbodiimide can be effectively used to prevent the hydrolytic degradation.

A heat stabilizer can be further added to the formulation to improve the heat aging properties of the formulation. In another embodiment, a radiation crosslinking agent can be added to the formulation. Such a radiation crosslinking agent promotes polymer crosslinking when exposed to radiation, such as from a high energy electron beam. The radiation crosslinking promoter may be chosen from among those conventionally used to promote crosslinking of polymers, including triallyl cyanurate (TAC), triallyl isocyranurate (TAIC), triallyl trimellitate, triallyl trimesate, tetrallyl pyromellitate, the diallyl ester of 1,1,3,-trimethyl-5-carboxy-3-(4-carboxyphenyl)indene, trimethylolpropane trimellitate (TMPTM), pentaerythritol trimethacrylate, tri(2-acryloxyethyl) isocyanurate, tri(2-methacryloxyethyl) trimellitate, and the like. Additional stabilizers, such as an aromatic amine type antioxidant, may also be added.

In the following, two particular embodiments of formulations according to the present invention will be described. As would be understood by one with ordinary skill in the art, however, it is clear that deviations can be made from the given percentages without departing from the general principle of the present invention.

Table 1 summarizes a first zero halogen formulation according to the present invention.

TABLE 1

| Description | MATERIAL | Wt % |
|---|---|---|
| Polyester-based thermoplastic elastomer | HYTREL-4056 | 35.6 |
| Antihydrolysis agent in a masterbatch | Hytrel 10MS | 8.4 |
| Ethylene acrylic elastomer | Vamac | 19.0 |
| Polyester adipate | PLASTHALL-P-650 | 5.3 |
| Flame retardant | Exolit 1240 or Exolit OP 935 | 22 |
| Other Additives | Additives include antioxidants, processing aid, fungicide, pigments, and a crosslinking enhancer | 9.7 |

By the formulation shown in Table 1, a lightweight, 150° C. rated, halogen-free, fire retardant crosslinkable polymer composition is provided for manufacturing heat shrinkable products. Non-halogenated heat shrinkable tubing can be fabricated from the formulation which is highly chemical resistant, lightweight and has superior tensile and elongation properties.

The organic aluminium phosphinate was melt mixed into the polyester elastomer based system which additionally contains several antioxidants and processing aids for better heat aging properties and improved processability. Incorporating 18 to 21% by weight of the organic aluminium phosphinate is sufficient to meet the flammability requirements of VG 95343-5 Type D specification. Higher percentages, for instance 25% by weight, can also be used.

Under certain application conditions, a smoke suppressant can be added to the composition. In the embodiment shown below in Table 2, the smoke retardant FireBrake is used in the composition in approximately 5% by weight. In another embodiment, the smoke suppressant may be zinc borate.

The following Table 2 shows an example of a composition according to the present invention that additionally contains a smoke suppressant.

TABLE 2

| Description | MATERIAL | Wt % |
|---|---|---|
| Polyester-based thermoplastic elastomer | HYTREL-4056 | 34.8 |
| Antihydrolysis agent in a masterbatch | Hytrel 10MS | 8.2 |
| Ethylene acrylic elastomer | Vamac | 18.6 |
| Polyester adipate | PLASTHALL-P-650 | 5.1 |
| Flame retardant | Exolit 1240 or Exolit OP 935 | 19 |
| Smoke suppressant | FireBrake | 4.9 |
| Other Additives | Additives include antioxidants, processing aid, fungicide, pigments, and a crosslinking enhancer | 9.4 |

According to the present invention, the flame retardant Exolit 1240 or Exolit OP 935 was used as the aluminium dialkyl phosphinate. According to the present invention, Exolit 1240 and Exolit OP 935 meet the requirements of VG 95343-5 Type D combustion behavior.

In summary, the formulation according to the present invention provides a flame retardant, halogen-free, lightweight polymer formulation which meets the requirements of VG 95343-5 Type D including fluid resistance at elevated temperatures (23° C. to 100° C.) a service temperature range from −55/−75° C. to 150° C., and good flexibility.

Advantageously, in the polymer composition according to the present invention, by using an organic phosphorus based flame-retardant in a matrix blend of a polyester-based thermoplastic elastomer and an ethylene acrylic elastomer, a lightweight, halogen-free, yet high strength heat shrinkable product is formed. In particular, a 150° C. (150 C) rating can be reached by using the polymer composition according to the present invention. The present invention provides an alternative, more efficient halogen-free and non-toxic flame retardant which has minimal impact on the mechanical and electrical properties due to its comparably low dosage in the elastomer matrix.

What is claimed is:

1. A polymer composition, comprising:
   30 to 40% by weight of a polyester-based thermoplastic elastomer;
   15 to 25% by weight of an ethylene acrylic elastomer; and
   an organic phosphorous-based flame retardant comprising a metal salt of a dialkyl phosphinate.
2. The polymer composition of claim 1, wherein the polyester-based thermoplastic elastomer comprises a copolymer of polybutylene terephthalate and polyalkylene-ether glycol.
3. The polymer composition of claim 1, wherein the metal salt is aluminium diethyl phosphinate.
4. The polymer composition of claim 1, wherein the ethylene acrylic elastomer comprises a terpolymer of ethylene, methyl acrylate, and a cure site monomer.
5. The polymer composition of claim 1, wherein the organic phosphorous-based flame retardant is 15 to 25% by weight of the composition.
6. The polymer composition of claim 1, further comprising an antihydrolysis agent.
7. The polymer composition of claim 6, wherein the antihydrolysis agent is an aromatic polymeric carbodiimide.
8. The polymer composition of claim 1, further comprising a stabilizing agent.
9. The polymer composition of claim 8, wherein the stabilizing agent is an aromatic amine type antioxidant.
10. The polymer composition of claim 1, further comprising a plasticizer.
11. The polymer composition of claim 10, wherein the plasticizer is a polyester adipate.
12. The polymer composition of claim 1, further comprising a radiation crosslinking agent.
13. The polymer composition of claim 12, wherein the radiation crosslinking agent is triallyl cyanurate (TAC), triallyl isocyranurate (TAIC), triallyl trimellitate, triallyl trimesate, tetrallyl pyromellitate, the diallyl ester of 1,1,3,-trimethyl-5-carboxy-3-(4-carboxyphenyl)indene, trimethylolpropane trimellitate (TMPTM), pentaerythritol trimethacrylate, tri(2-acryloxyethyl) isocyanurate, tri(2-methacryloxyethyl) trimellitate, or a combination thereof.
14. The polymer composition of claim 1, further comprising a smoke suppressant.
15. The polymer composition of claim 14, wherein the smoke suppressant is zinc borate.
16. A heat shrinkable article, comprising:
    a tube or molded part formed from a polymer composition comprising 30 to 40% by weight of a polyester-based thermoplastic elastomer, 15 to 25% by weight of an ethylene acrylic elastomer, and an organic phosphorous-based flame retardant comprising a metal salt of a dialkyl phosphinate.
17. The heat shrinkable article of claim 16, wherein the tube is an electrically insulating tube.
18. A cable, comprising:
    a sheathing or jacket formed from a polymer composition comprising 30 to 40% by weight of a polyester-based thermoplastic elastomer, 15 to 25% by weight of an ethylene acrylic elastomer, and an organic phosphorous-based flame retardant comprising a metal salt of a dialkyl phosphinate.

* * * * *